United States Patent
Chopade et al.

(10) Patent No.: US 11,124,698 B2
(45) Date of Patent: Sep. 21, 2021

(54) ACIDIZING AND PROPPANT TRANSPORT WITH EMULSIFIED FLUID

(71) Applicant: Halliburton Energy Services, Inc., Houston, TX (US)

(72) Inventors: Prashant D. Chopade, Kingwood, TX (US); Rajender Salla, Maharashtra (IN); Monica Rajendra Dandawate, Maharashtra (IN); Enrique Antonio Reyes, Tomball, TX (US); Walter T. Stephens, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 195 days.

(21) Appl. No.: 16/339,458

(22) PCT Filed: Nov. 7, 2016

(86) PCT No.: PCT/US2016/060792
§ 371 (c)(1),
(2) Date: Apr. 4, 2019

(87) PCT Pub. No.: WO2018/084866
PCT Pub. Date: May 11, 2018

(65) Prior Publication Data
US 2020/0048540 A1    Feb. 13, 2020

(51) Int. Cl.
*C09K 8/80* (2006.01)
*C09K 8/72* (2006.01)
*C09K 8/82* (2006.01)

(52) U.S. Cl.
CPC ............ *C09K 8/805* (2013.01); *C09K 8/72* (2013.01); *C09K 8/82* (2013.01)

(58) Field of Classification Search
CPC ............ C09K 8/805; C09K 8/72; C09K 8/82
See application file for complete search history.

(56) References Cited

U.S. PATENT DOCUMENTS

| | | | | |
|---|---|---|---|---|
| 3,307,630 A | * | 3/1967 | Dilgren | C09K 8/72 166/300 |
| 4,457,373 A | * | 7/1984 | Balzer | C09K 8/584 166/400 |

(Continued)

FOREIGN PATENT DOCUMENTS

| | | |
|---|---|---|
| WO | 2007/088322 A1 | 8/2007 |
| WO | 2013/087844 A1 | 6/2013 |
| WO | 2015/016911 A1 | 2/2015 |

OTHER PUBLICATIONS

Morsy, Samiha, et al. "Potential of improved waterflooding in acid-hydraulically-fractured shale formations." SPE 166403-MS. SPE Annual Technical Conference and Exhibition. Society of Petroleum Engineers, 2013.

(Continued)

*Primary Examiner* — Crystal J Miller
(74) *Attorney, Agent, or Firm* — Thomas Rooney; Baker Botts L.L.P.

(57) ABSTRACT

Methods and compositions for stimulating oil or gas production from a well with a single treatment fluid for use in a combined acidizing and hydraulic fracturing treatment are provided. An embodiment is a method comprising: coating a plurality of proppant particulates with oil to form oil-coated proppant particulates; adding the oil-coated proppant particulates to a solution comprising water, an acid source, and an emulsifier, wherein the ratio of the oil coating the proppant particulates to the water in the solution is less than 20:80 by volume; and mixing the solution and the oil-coated proppant particulates to form a treatment fluid comprising a water-in-oil emulsion and the oil-coated proppant particulates.

20 Claims, 5 Drawing Sheets

(56) References Cited

U.S. PATENT DOCUMENTS

| | | |
|---|---|---|
| 6,562,764 B1 | 5/2003 | Donaldson et al. |
| 9,038,717 B2 | 5/2015 | Vo et al. |
| 2005/0244641 A1 | 11/2005 | Vincent |
| 2009/0107673 A1* | 4/2009 | Huang .................... C09K 8/68 166/280.2 |
| 2014/0144632 A1* | 5/2014 | Zavolzhski ............ C09K 8/592 166/280.2 |
| 2014/0311740 A1 | 10/2014 | Patil et al. |
| 2014/0367100 A1* | 12/2014 | Oliveira .................. C09K 8/80 166/280.1 |
| 2016/0222282 A1 | 8/2016 | Zhang et al. |

OTHER PUBLICATIONS

Lv, Qichao, et al. "Study of nanoparticle-surfactant-stabilized foam as a fracturing fluid." Industrial & Engineering Chemistry Research 54.38 (2015): 9468-9477.

International Search Report and Written Opinion issued in related PCT Application No. PCT/US2016/060225 dated Jul. 28, 2017, 13 pages.

\* cited by examiner

ACIDIZING AND PROPPANT TRANSPORT WITH EMULSIFIED FLUID

CROSS-REFERENCE TO RELATED APPLICATION

The present application is a U.S. National Stage Application of International Application No. PCT/US2016/060792 filed Nov. 7, 2016, which is incorporated herein by reference in its entirety for all purposes.

BACKGROUND

The present disclosure relates to methods and compositions for treating subterranean formations. A "subterranean formation" is a body of rock that has sufficiently distinctive characteristics and is sufficiently continuous for geologists to describe, map, and name it. A subterranean formation having a sufficient porosity and permeability to hold and transmit fluids is sometimes referred to as a "reservoir." Oil and gas are naturally occurring hydrocarbons in certain subterranean formations such as reservoirs.

To produce oil or gas from a reservoir, a well bore is drilled into a subterranean formation, which may be the reservoir or adjacent to the reservoir. Subterranean treatments may be used to facilitate or enhance the production of desirable fluids such as oil or gas from or through a subterranean formation. Treatment fluids may be used in a variety of subterranean treatments to enhance the production of desirable fluids. As used herein, the term "treatment," or "treating," refers to any subterranean operation that uses a fluid in conjunction with a desired function and/or for a desired purpose. The term "treatment," or "treating," does not necessarily imply any particular action by the fluid.

During completion or intervention, stimulation is a type of treatment performed to enhance or restore the productivity of oil and gas from a well. Typical stimulation treatments generally fall into two main groups: hydraulic fracturing and acidizing treatments. Fracturing treatments are performed above the fracture pressure of the subterranean formation to create or extend a permeable flow path between the formation and the well bore. Acidizing treatments generally are performed below the fracture pressure of the formation.

Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. A newly-created or newly-extended fracture will tend to close together after the pumping of the fracturing fluid is stopped. To prevent the fracture from closing, the fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore.

In acidizing treatment operations, a subterranean formation containing an acid-soluble material may be treated with an acid to dissolve at least a portion of the acid-soluble material. Components of the formation matrix may comprise the acid-soluble material in some cases. Illustrative examples of formation components that may be dissolved by an acid include, for example, carbonates, silicates, and aluminosilicates. Dissolution of these formation components can open voids and conductive flow pathways in the formation that can improve the formation's rate of fluid production, for example. In a similar type of treatment, acidization may be used to remove like types of precipitation damage that can be present in the formation.

Sometimes, it may be possible to employ combined hydraulic fracturing and acidizing. The purpose of this combined approach is to treat a formation with both acidizing fracturing and hydraulic fracturing to maximize fracture conductivity. These applications typically consist of two-step treatment in the same treatment zone. For sandstone formations, an acidizing fracturing fluid may be pumped first followed by a proppant particulate carrying fracturing fluid. For carbonate formations, a proppant particulate carrying fracturing fluid may be pumped first followed by an acidizing fluid. Field applications based on this combined approach may show increased production.

Two concerns with these sequential procedures include (a) increased fluid leak-off during subsequent proppant fracturing after first pumping an acidizing fluid, and (b) proppant particulate over-displacement during subsequent acid pumping after first pumping an proppant-carrying fracturing fluid. "Fluid leak-off" or "fluid loss" refers to the undesirable leakage of a fluid phase of any type of fluid into the permeable matrix of a zone, which zone may or may not be a treatment zone. Fluid-loss control refers to treatments designed to reduce such undesirable leakage. "Over-displacement" of a proppant particulate occurs when a proppant particulate is carried too far into a fracture such that a near well bore portion of the fracture is not adequately propped open with proppant particulate, in which case the near-well bore portion of a fraction can close and lose the benefit of the communication between the far end of the fracture and the well bore.

BRIEF DESCRIPTION OF THE DRAWINGS

These drawings illustrate certain aspects of some of the embodiments of the present disclosure, and should not be used to limit or define the claims.

FIG. 3 is a series of photographs that illustrates a treatment fluid prepared according to an embodiment of the present disclosure.

Figure 1:
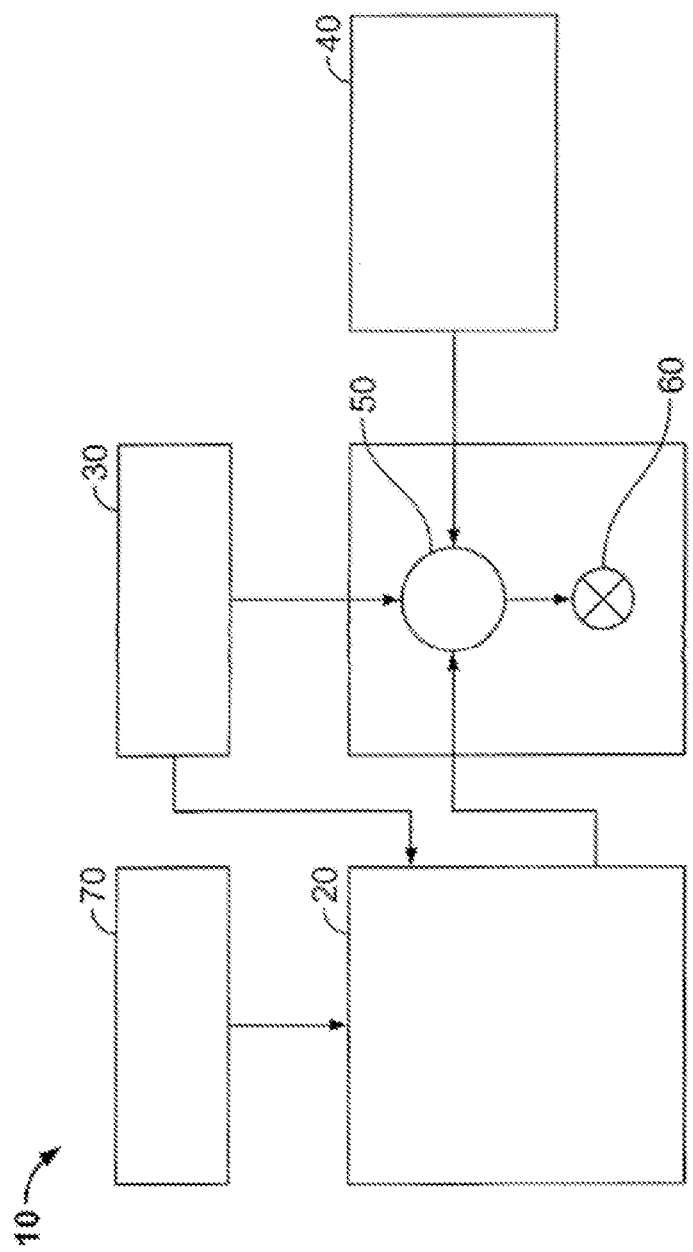
FIG. 1 is a diagram illustrating an example of a system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and compositions for treating subterranean formations. More particularly, the present disclosure relates to methods and compositions for stimulating oil or gas production from a well with a single treatment fluid for use in a combined acidizing and hydraulic fracturing treatment.

The present disclosure provides an emulsified source of an acid as both a retarded acid fluid and as a carrier fluid for a proppant particulate in fracturing of a zone. In general, the treatment fluid of the present disclosure includes a water-in-oil emulsion having an oil to water ratio of less than 20:80 by volume, wherein the internal aqueous phase comprises an acid source. The emulsion provides a retarded acid system that can create penetration into the formation for the purpose of acid fracturing. The water-in-oil emulsion is also selected for suspending a proppant particulates for hydraulic fracturing. The dual purpose fluid simultaneously creates acid penetration into the matrix of a formation while providing proppant particulate transport. The retarded nature of the acid fluid, among other benefits, allows time for placing the proppant particulate while increasing the permeability of the formation and preferably etching the fracture face or forming wormholes.

Among the many potential advantages to the methods and compositions of the present disclosure, only some of which are alluded to herein, the methods, compositions, and systems of the present disclosure may perform both acid and hydraulic fracturing simultaneously for maximum formation stimulation. Moreover, as noted and unlike previous approaches, the present disclosure provides a water-in-oil emulsion with an oil to water ratio of less than 20:80 by volume. Due to the lower oil loading, the total cost of the emulsified fluid may be lower and environmental concerns associated with higher concentrations of oil may be avoided.

The methods and compositions of the present disclosure generally involve a single treatment fluid for use in a combined acidizing and hydraulic fracturing treatment. The treatment fluid comprises (A) a water-in-oil emulsion having an oil to water ratio of less than 20:80 by volume and (B) a plurality of proppant particulates. The water-in-oil emulsion comprises a continuous oil phase, an internal aqueous phase, and an emulsifier. The internal aqueous phase comprises water and a source of acid. Exemplary embodiments of the methods and compositions of the present disclosure are discussed herein.

According to an embodiment of the present disclosure, the treatment fluid of the present disclosure comprises an emulsion. An emulsion is a fluid including a dispersion of immiscible liquid particles or droplets in an external (i.e., continuous) liquid phase. In addition, the proportion of the external and internal phases is above the solubility of either in the other. A stable emulsion is an emulsion that will not cream, flocculate, or coalesce under certain conditions, including time and temperature. As used herein, the term "cream" means at least some of the droplets of a dispersed phase converge towards the surface or bottom of the emulsion. The converged droplets maintain a discrete droplet form. As used herein, the term "flocculate" means at least some of the droplets of a dispersed phase combine to form small aggregates in the emulsion. As used herein, the term "coalesce" means at least some of the droplets of a dispersed phase combine to form larger drops in the emulsion. A chemical can be included to reduce the interfacial tension between the two immiscible liquids to help with stability against coalescing of the internal liquid phase, in which case the chemical may be referred to as a surfactant or more particularly as an emulsifier or emulsifying agent.

According to an embodiment of the present disclosure, the treatment fluid specifically comprises a water-in-oil emulsion, which refers to an internal aqueous phase surrounded by a continuous oil phase. In the context of an emulsion, a "water phase" or "aqueous phase" refers to a phase of water or an aqueous solution. An "oil phase" refers to a phase of any non-polar, organic liquid that is immiscible with water, usually an oil. A water-in-oil emulsion is sometimes referred to as an invert emulsion.

According to embodiments of the present disclosure, the water-in-oil emulsion is a majority water by volume. Preferably, the oil to water ratio is less than about 20:80 by volume. In some embodiments, the oil to water ratio is less than about 10:90 by volume. In some embodiments, the oil to water ratio is about 1:20 by volume. As noted earlier, the lower oil loading may result in lower costs and may alleviate environmental concerns in some instances.

The continuous oil phase of the emulsion may comprise any oil known in the art, including but not limited to diesel oil, mineral oil, synthetic oil, enhanced mineral oil, and any combination thereof. In the context of a fluid, oil is understood to refer to any kind of oil in a liquid state. In this context, an oil is any substance that is liquid under Standard Laboratory Conditions, is hydrophobic, and soluble in organic solvents. Oils typically have a high carbon and hydrogen content and are non-polar substances. This general definition includes classes such as petrochemical oils, vegetable oils, and many organic solvents. In some embodiments, the oil phase of the emulsion of the treatment fluid does not contain anything that would adversely interact with the other components used in the fluid or with the subterranean formation.

The internal aqueous phase of an emulsion comprises water. In some embodiments, the aqueous phase may include freshwater or non-freshwater. Non-freshwater sources of water can include surface water ranging from brackish water to seawater, brine, returned water (sometimes referred to as flowback water) from the delivery of a fluid into a well, unused fluid, and produced water. In some embodiments, the water for use in the emulsion of the treatment fluid does not contain anything that would adversely interact with the other components used in the fluid or with the subterranean formation. For example, in general, for water to be suitable for use in common well treatments, it should not contain one or more materials that would be particularly detrimental to the chemistry involved in such well treatments. In addition, in some embodiments, the water is cleaned of undissolved, suspended solids (for example, silt) at least to a point that the natural permeability and the conductivity of the fracture will not be damaged. For this purpose, all the water used in a well treatment can be filtered to help reduce the concentration of suspended, undissolved solids that may be present in the water, such as silt.

The internal aqueous phase of an emulsion further comprises an acid source. In some embodiments, the acid source may comprise a mineral acid or an organic acid. Mineral acids tend to dissociate in water more easily than organic acids, to produce H+ ions and decrease the pH of the solution. Organic acids tend to dissociate more slowly than mineral acids and less completely. According to one embodiment, the acid source is hydrochloric acid (HCl). According to another embodiment, hydrofluoric acid (HF) may be included, for example, when acidizing of a sandstone formation. In certain embodiments, the acid source may comprise complexing and chelating agents that are soluble in the internal phase such as HEDTA, GLDA, MGDA, HIDS, EDDS, IDA, phoshponic acids, citric acid, glycolic acid, malonic acid, gluconic acid, lactic acid, methane sulfonic acid, fluoroboric acid, hydrochloride salts such as urea hydrochloride, glycine hydrochloride, and similar salts that have an acidity greater than 3.5% weight by volume. In certain embodiments, the acid has a pKa from about −3.0 to about 5.5.

According to an embodiment of the present disclosure, a type and a concentration of acid necessary to obtain a desired pH in the aqueous phase may be used. In certain embodiments, the pH of the aqueous phase of the treatment fluid is less than about 4.5. Those of ordinary skill in the art with the benefit of this disclosure will be able to determine the necessary concentration of acid source to obtain the desired pH. In certain embodiments, a buffering agent may be used to maintain the desired pH.

In some embodiments, the aqueous phase of the treatment fluid may optionally comprise one or more dissolved salts or can be a brine. Suitable salts may include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The concentration of a salt added may be the amount necessary for formation compatibility, such as stability of clay minerals, taking into consideration the crystallization temperature of the brine, for example, the temperature at which the salt precipitates from the brine as the temperature drops. For example, the brine can be chosen to be compatible with the formation to be treated and should have a sufficient density to provide the appropriate degree of well control.

The water-in-oil emulsion of the treatment fluid of the present disclosure further comprises an emulsifier. As used herein, an "emulsifier" refers to a type of surfactant that helps prevent the droplets of the dispersed phase of an emulsion from flocculating or coalescing in the emulsion. Examples of emulsifiers that may be suitable include, but are not limited to, emulsifiers with an HLB (Davies' scale) in the range of about 4 to about 12. An emulsifier or emulsifier package is preferably in a concentration of at least 1% by weight of the emulsion. More preferably, the emulsifier is in a concentration in the range of 1% to 10% by weight of the emulsion.

The treatment fluids of the present disclosure further comprise a plurality of proppant particulates. A proppant particulate is in the form of a solid particulate, which can be suspended in the treatment fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the well bore compared to the permeability of the matrix of the surrounding subterranean formation. This higher-permeability flow path increases oil and gas production from the subterranean formation.

A particulate for use as a proppant particulate is usually selected based on the characteristics of size range, crush strength, and solid stability in the types of fluids that are encountered or used in wells. Examples of suitable proppant particulate materials include, without limitation, sand, gravel, bauxite, ceramic materials, glass materials, polymer materials, wood, plant and vegetable matter, nut hulls, walnut hulls, cottonseed hulls, cured cement, fly ash, fibrous materials, composite particulates, hollow spheres or porous particulate. Mixtures of different kinds or sizes of proppant particulate can be used as well. Further, a suitable proppant particulate should be stable over time and not dissolve in fluids commonly encountered in a well environment. Preferably, a proppant particulate material is selected that will not dissolve in water or crude oil.

The proppant particulate is usually selected to be an appropriate size to prop open the fracture and bridge the fracture width expected to be created by the fracturing conditions and the fracturing fluid. If the proppant particulate is too large, it will not easily pass into a fracture and will screen-out too early. If the proppant particulate is too small, it will not provide the fluid conductivity to enhance production. In the case of fracturing relatively permeable or even tight-gas reservoirs, a proppant pack should provide higher permeability than the matrix of the formation. In the case of fracturing ultra-low permeable formations, such as shale formations, a proppant pack should provide for higher permeability than the naturally occurring fractures or other micro-fractures of the fracture complexity. Appropriate sizes of particulate for use as a proppant particulate are typically in the range from about 8 to about 100 U.S. Standard Mesh. In certain embodiments, a proppant particulate may be sand-sized, which geologically is defined as having a largest dimension ranging from about 0.06 millimeters up to about 2 millimeters (mm).

According to embodiments of the present disclosure, the concentration of proppant particulate in the treatment fluid may depends upon factors such as the nature of the subterranean formation. As the nature of subterranean formations may differ, the concentration of proppant particulate in the treatment fluid may be in the range of from about 0.03 kilograms to about 12 kilograms of proppant per liter of liquid phase of the treatment fluid (i.e., from about 0.1 lb/gal to about 25 lb/gal).

In certain embodiments, the treatment fluids used in the methods and compositions of the present disclosure optionally may comprise any number of additional additives. Examples of such additional additives include, but are not limited to, salts, surfactants, acids, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, hydrate inhibitors, lubricants, additional viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

In some embodiments, treatment fluids of the present disclosure may be prepared according to the following steps. First, proppant particulates may be coated with a desired amount of the oil that will form the oil phase. Prior to this coating step, the proppant particulates may be substantially dry. After the proppant particulates have been coated with the oil, they may be added to an aqueous solution comprising water and an acid source. The volume of oil used to coat the proppant particulates and the volume of water may be chosen to produce a pre-determined ratio of oil to water in the final emulsion. In certain embodiments, the aqueous solution further comprises an emulsifier. In other embodiments, the emulsifier may be added to the solution after the proppant particulates are added. In either embodiment, the solution described above then may be mixed to form a water-in-oil emulsion. The solution may be mixed under an overhead stirrer. In some embodiments, the solution may be mixed using a stirrer or blender at a rate of from about 40

RPM to about 600 RPM for forming the desired emulsion. The resulting emulsion has droplets of an acidic aqueous phase and proppant particulates both suspended in the external oil phase.

It has been discovered, unexpectedly, that coating the proppant particulates with oil before adding them to water permits the creation of a water-in-oil emulsion with a much lower concentration of oil than has previously been obtained. The ratio of oil to water in the treatment fluids of the present disclosure may be less than 20:80 by volume in some embodiments, less than 10:90 in other embodiments, and about 1:20 in other embodiments. By way of contrast, water-in-oil emulsions formed by mixing oil and water before adding the proppant are unable to achieve oil concentrations of less than 20% by volume.

A treatment fluid according to the present disclosure may be prepared at the job site, prepared at a plant or facility prior to use, or certain components of the fluid can be pre-mixed prior to use and then transported to the job site. In certain embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

For pre-mixing the emulsion part of a treatment fluid according to the invention, a centrifugal pump and two tanks can be employed: one tank holding the proppant particulates and the hydrocarbon phase and the other tank holding the aqueous phase. For on-the-fly mixing, an additional mixing element or device can provide sufficient shear to create the emulsion. Both options are possible. An emulsion according to the present disclosure may be adapted to be stable for days or weeks. So it can be pre-mixed ahead of time off-site or on-site. The emulsion also has the option of being mixed on the fly as it is being pumped. In offshore operations where storage capacity is very limited acid emulsions are preferably mixed on the fly.

According to an embodiment of the present disclosure, a method of treating a subterranean formation is provided, the method including the steps of: forming a treatment fluid according to the present disclosure; and introducing the treatment fluid into a well bore or a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation. In some embodiments, the treatment fluid may flow back to the surface.

After the step of introducing a treatment fluid into a well bore or a subterranean formation, the method can include a step of allowing time for the acid of the treatment fluid to spend in the formation. In addition, the method can include allowing time for the emulsion to break in the formation, if the emulsion is adapted to break after the spending of the acid, separating the two phases substantially separating such that the emulsion is broken. In certain embodiments, a displacement fluid may be introduced into the well bore after injecting the treatment fluid.

In certain embodiments, the step of introducing the treatment fluid into the well bore or the subterranean formation may further comprise a step of designing or determining a fracturing treatment for a treatment zone of the subterranean formation. For example, a step of designing can comprise: (a) determining the design temperature and design pressure; (b) determining the total designed pumping volume of the one or more treatment fluids to be pumped into the subterranean formation at a rate and pressure above the fracture pressure of the subterranean formation; (c) designing a treatment fluid, including its composition and rheological characteristics; (d) designing the pH of the treatment fluid; (e) determining the size of a proppant particulate of a proppant pack previously formed or to be formed in fractures in the subterranean formation; or (f) designing the loading of any proppant particulate in the treatment fluid. In one embodiment, for example, a person of skill in the art with the teachings of this disclosure may determine a concentration of alkaline buffering agent based on the designed pH of the treatment fluid.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes an aqueous phase producing apparatus 20, an acid source 30, a proppant particulate source 40, and a pump and blender system 50 and resides at the surface at a well site where a well 60 is located.

In certain instances, the aqueous phase producing apparatus 20 combines an acidic aqueous solution from acid source 30 with optional additives to produce the aqueous phase that is used in the emulsion of the treatment fluid. The system may also include additive source 70 that provides one or more additives (e.g., gelling agents, weighting agents, and/or other optional additives) to alter the properties of the aqueous phase of the emulsion of the treatment fluid. In other instances, the aqueous phase producing apparatus 20 can be omitted and an acidic aqueous solution may be sourced directly from the acid source 30.

The proppant particulate source 40 can include a proppant particulate for combination with the acidic aqueous solution. As noted in the description above, the proppant particulates are coated with oil before they are added to the aqueous solution. The oil coating the proppant particulates from proppant particulate source 40 and the acidic aqueous solution may be mixed to form a water-in-oil emulsion.

The pump and blender system 50 receives the acidic aqueous solution and combines it with other components, including the oil-coated proppant particulate from the proppant particulate source 40 and/or additional fluid from the additives 70. The resulting emulsion may be pumped down the well 60 under a pressure sufficient to create or enhance one or more fractures in a subterranean zone, for example, to stimulate production of fluids from the zone. Notably, in certain instances, the aqueous phase producing apparatus 20, acid source 30, and/or proppant particulate source 40 may be equipped with one or more metering devices (not shown) to control the flow of fluids, proppant particulates, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppant particulates at other times, and combinations of those components at yet other times.

Figure 2:
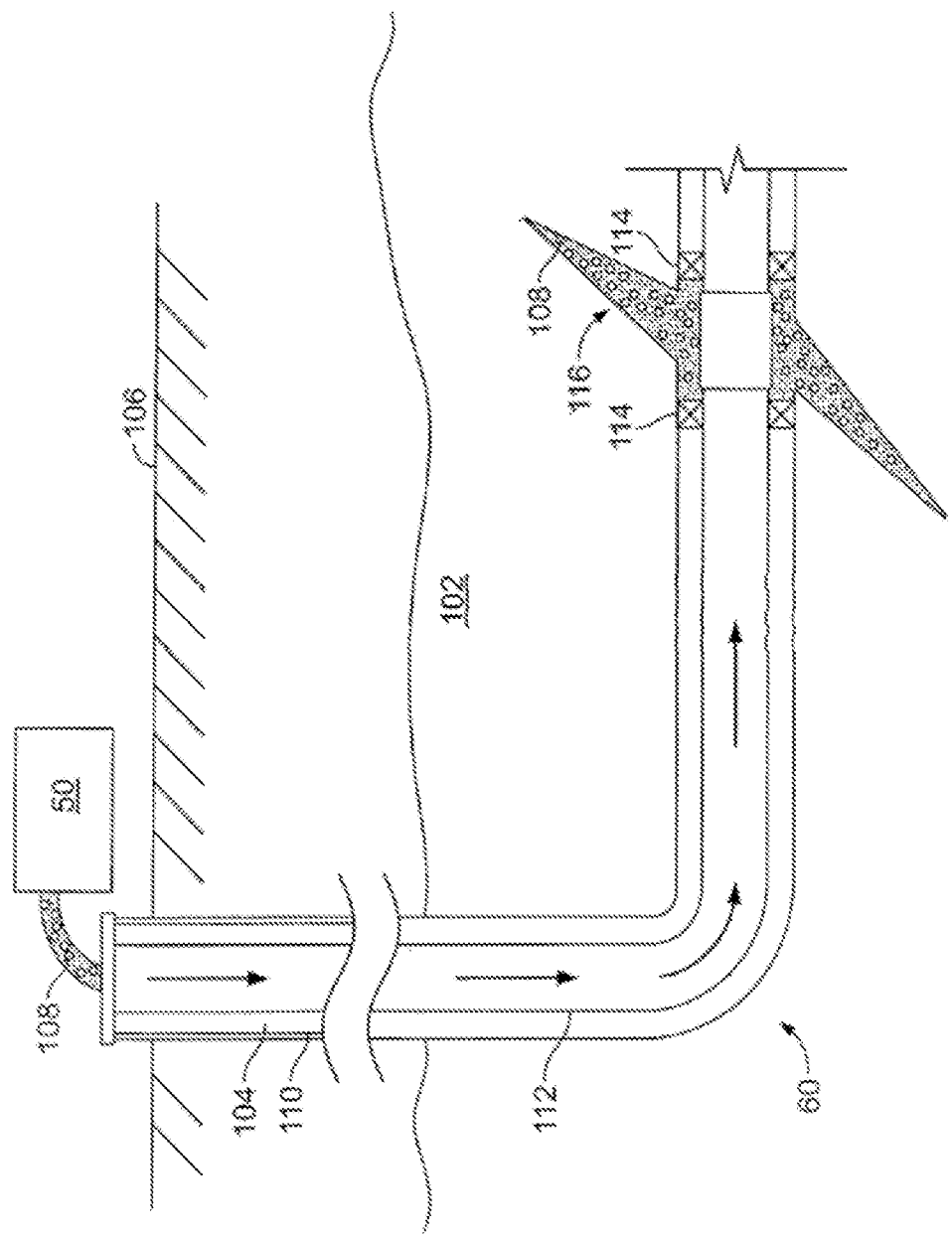
FIG. 2 is a diagram illustrating an example of a subterranean formation in which a treatment operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the treatment fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the treatment fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the treatment fluid 108 directly into the subterranean formation 102, and/or the working string 112 may include ports that are spaced apart from the well bore wall to communicate the treatment fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the treatment fluid 108 will be pumped. FIG. 2 shows two packers 114, one defining an uphole boundary of the interval and one defining the downhole end of the interval. When the treatment fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the treatment fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

To facilitate a better understanding of the present disclosure, the following examples of certain aspects of preferred embodiments are given. The following examples are not the only examples that could be given according to the present disclosure and are not intended to limit the scope of the disclosure or claims.

Example 1

The following steps illustrate the preparation of a sample of a treatment fluid according to an embodiment of the present disclosure. First, 36 grams (6 lb/gal) of UNIFRAC® 20/40 sand (available from Unimin Energy Solutions) was coated with 2.64 mL of ESCAID™ 110 Fluid, a hydrocarbon fluid available from Exxon Corporation. The coated particulates were added to 47.46 mL of 10% HCl solution and 0.5 mL (10 gal/1000 gal) EZ MUL® NT emulsifier (available from Halliburton Energy Services). The oil to water ratio of the mixture was about 1:20 by volume. Calcium chloride was added in a concentration of about 0.5% weight by volume. The solution was mixed to form an emulsion. In this example, the emulsion was prepared under an overhead stirrer maintain a speed of about 475 RPM.

A static settling test of this acid-in-oil emulsion with proppant particulate showed no significant proppant particulate settling for four hours. After four hours, the emulsion started to break slowly.

Example 2

A series of tests were performed to evaluate the effect of coating a particulate with oil prior to mixing it with the aqueous fluid. For each of the tests, a formulation was prepared using ESCAID™ 110 Fluid as the oil, 10% HCl solution as the aqueous fluid, Brady Sand as the particulate, EZ MUL® NT emulsifier, and 0.5% calcium chloride.

Four formulations were prepared with the ingredients listed above and are illustrated in Table 1 below. Formulations 1 and 2 had an oil:water ratio of 10:90. Formulations 3 and 4 had an oil:water ratio of 5:95. Formulation 1 and Formulation 3 were prepared by mixing the oil and the aqueous fluid without coating the Brady Sand. In contrast, Formation 2 and Formulation 4 were prepared by coating the Brady Sand with the oil before combining it with the aqueous fluid.

TABLE 1

| Formulation | Oil:water | Oil Coated on Brady Sand | Emulsion formed | Instrument and rpm | Duration for forming emulsion (Seconds) |
|---|---|---|---|---|---|
| 1 | 10:90 | NO | NO | Warring Blender 10,000 rpm | — |
| 2 | 10:90 | YES | YES | Overhead stirrer 475 rpm | 180 |
| 3 | 5:95 | NO | NO | Warring Blender 10,000 rpm/ Overhead stirrer | — |
| 4 | 5:95 | YES | YES | Overhead stirrer 475 rpm | 180 to 200 |

Figure 3A:
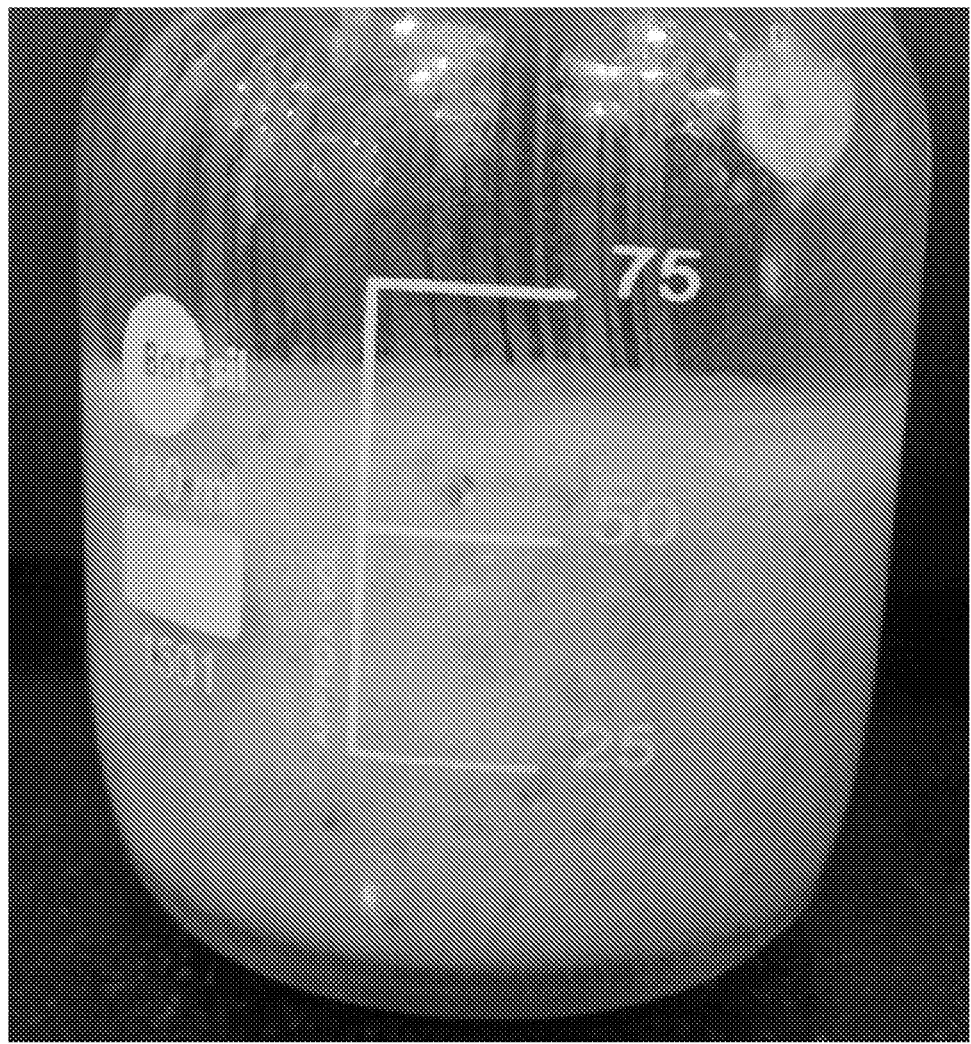
FIG. 3A is a photograph of a sample having an oil:water ratio of 5:95 in an emulsified state.
Figure 3B:
FIG. 3B is a photograph of a sample having an oil:water ratio of 10:90 after the emulsion has broken.
Figure 3C:
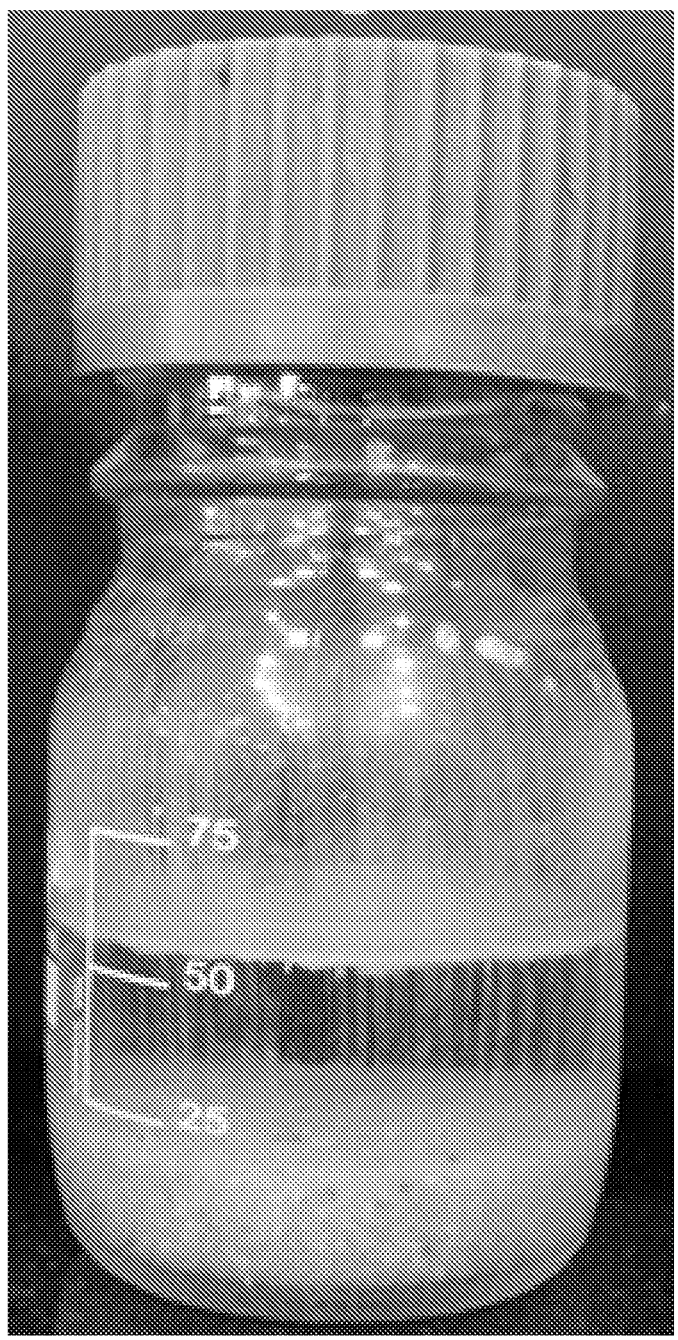
FIG. 3C is a photograph of a sample having an oil:water ratio of 5:95 after the emulsion has broken.

As can be seen in Table 1, only the formulations prepared by coating the Brady Sand with the oil before combining it with the aqueous fluid resulted in water-in-oil emulsions. Moreover, the emulsion with 5% oil (Formulation 4) was stable for at least four hours with excellent proppant particulate carrying capacity. FIG. 3 illustrates the results of the test described above. FIG. 3A is a photograph of a sample of Formulation 4 in an emulsified state. FIG. 3B is a photograph of a sample of Formulation 2 after the emulsion has broken. FIG. 3C is a photograph of a sample of Formulation 4 after the emulsion has broken.

An embodiment of the present disclosure is a method comprising: coating a plurality of proppant particulates with oil to form oil-coated proppant particulates; adding the oil-coated proppant particulates to a solution comprising water, an acid source, and an emulsifier, wherein the ratio of the oil coating the proppant particulates to the water in the solution is less than 20:80 by volume; and mixing the solution and the oil-coated proppant particulates to form a treatment fluid comprising a water-in-oil emulsion and the oil-coated proppant particulates. Optionally, the water-in-oil emulsion has an oil to water ratio of less than 10:90 by volume. Optionally, the water-in-oil emulsion has an oil to water ratio of about 1:20 by volume. Optionally, the acid source comprises an acid selected from the group consisting of: hydrochloric acid, hydrofluoric acid, fluoroboric acid, methanesulfonic acid, formic acid, phosphoric acid, sulfuric acid, chlorosulfonic acid, chloroacetic acid, dichloroacetic acid, trichloroacetic acid; MGDA; GLDA; EDDS; HIDS; HEDTA; IDA; gluconic acid; lactic acid; glycolic acid; maleic acid; citric acid; and any combination thereof. Optionally, the emulsifier has an HLB of from about 4 to about 12. Optionally, the method further comprises the step of injecting the treatment fluid into a well bore penetrating at least a portion of a subterranean formation at pressure greater than a fracture gradient of the subterranean formation. Optionally, the method further comprises the step of injecting a displacement fluid into the well bore after injecting the treatment fluid. Optionally, the treatment fluid is injected into the well bore using one or more pumps.

Another embodiment of the present disclosure is a method comprising: providing a treatment fluid comprising: (A) a water-in-oil emulsion having an oil to water ratio of less than 20:80 by volume, wherein the water-in-oil emulsion comprises: a continuous oil phase, an internal aqueous phase comprising water and an acid source, and an emulsifier; and (B) a plurality of proppant particulates; and injecting the treatment fluid into a well bore penetrating at least a portion of a subterranean formation at pressure greater than a fracture gradient of the subterranean formation. Optionally, the water-in-oil emulsion has an oil to water ratio of less than 10:90 by volume. Optionally, the water-in-oil emulsion has an oil to water ratio of about 1:20 by volume. Optionally, the acid source comprises an acid selected from the group consisting of: hydrochloric acid, hydrofluoric acid, fluoroboric acid, methanesulfonic acid, formic acid, phosphoric acid, sulfuric acid, chlorosulfonic acid, chloroacetic acid, dichloroacetic acid, trichloroacetic acid; MGDA; GLDA; EDDS; HIDS; HEDTA; IDA; gluconic acid; lactic acid; glycolic acid; maleic acid; citric acid; and any combination thereof. Optionally, the emulsifier has an HLB of from about 4 to about 12. Optionally, the method further comprises the step of injecting a displacement fluid into the well bore after injecting the treatment fluid. Optionally, the treatment fluid is injected into the well bore using one or more pumps.

Another embodiment of the present disclosure is a composition comprising: (A) a water-in-oil emulsion having an oil to water ratio of less than 20:80 by volume, wherein the water-in-oil emulsion comprises: a continuous oil phase, an internal aqueous phase comprising water and an acid source, and an emulsifier; and (B) a plurality of proppant particulates. Optionally, the water-in-oil emulsion has an oil to water ratio of less than 10:90 by volume. Optionally, the water-in-oil emulsion has an oil to water ratio of about 1:20 by volume. Optionally, the acid source comprises an acid selected from the group consisting of: hydrochloric acid, hydrofluoric acid, fluoroboric acid, methanesulfonic acid, formic acid, phosphoric acid, sulfuric acid, chlorosulfonic acid, chloroacetic acid, dichloroacetic acid, trichloroacetic acid; MGDA; GLDA; EDDS; HIDS; HEDTA; IDA; gluconic acid; lactic acid; glycolic acid; maleic acid; citric acid; and any combination thereof. Optionally, the emulsifier has an HLB of from about 4 to about 12.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    coating a plurality of proppant particulates with oil to form oil-coated proppant particulates;
    adding the oil-coated proppant particulates to a solution comprising water, an acid source, and an emulsifier; and
    mixing the solution, an oil, and the oil-coated proppant particulates to form a treatment fluid comprising a water-in-oil emulsion and the oil-coated proppant particulates, wherein the water-in-oil emulsion has an oil to water ratio of less than 20:80 by volume.

2. The method of claim 1 wherein the water-in-oil emulsion has an oil to water ratio of less than 10:90 by volume.

3. The method of claim 1 wherein the water-in-oil emulsion has an oil to water ratio of about 1:20 by volume.

4. The method of claim 1 wherein the acid source comprises an acid selected from the group consisting of: hydrochloric acid, hydrofluoric acid, fluoroboric acid, methanesulfonic acid, formic acid, phosphoric acid, sulfuric acid, chlorosulfonic acid, chloroacetic acid, dichloroacetic acid, trichloroacetic acid; MGDA; GLDA; EDDS; HIDS; HEDTA; IDA; gluconic acid; lactic acid; glycolic acid; maleic acid; citric acid; and any combination thereof.

5. The method of claim 1 wherein the emulsifier has an HLB of from about 4 to about 12.

6. The method of claim 1 further comprising the step of injecting the treatment fluid into a well bore penetrating at least a portion of a subterranean formation at pressure greater than a fracture gradient of the subterranean formation.

7. The method of claim 6 further comprising the step of injecting a displacement fluid into the well bore after injecting the treatment fluid.

8. The method of claim 7 wherein the water-in-oil emulsion has an oil to water ratio of less than 10:90 by volume.

9. The method of claim 7 wherein the water-in-oil emulsion has an oil to water ratio of about 1:20 by volume.

10. The method of claim 7 wherein the acid source is hydrochloric acid and the emulsifier has an HLB of from about 4 to about 12.

11. The method of claim 6 wherein the treatment fluid is injected into the well bore using one or more pumps.

12. The method of claim 1 wherein the water-in-oil emulsion has an oil to water ratio of about 5:95 by volume.

13. The method of claim 1 wherein the acid source is hydrochloric acid.

14. The method of claim 1 wherein the acid source is hydrofluoric acid.

15. The method of claim 1 wherein the acid source has a pKa from about −3.0 to about 5.5.

16. The method of claim 1 wherein the emulsifier has a concentration of at least 1% by weight of the water-in-oil emulsion.

17. The method of claim 1 wherein the emulsifier has a concentration in a range from 1% to 10% by weight of the water-in-oil emulsion.

18. The method of claim 1 wherein the treatment fluid comprises a salt selected from the group consisting of: calcium chloride, sodium chloride, magnesium chloride, potassium chloride, sodium bromide, potassium bromide, ammonium chloride, sodium formate, potassium formate, cesium formate, and any combination thereof.

19. The method of claim 1 wherein the treatment fluid comprises calcium chloride.

20. The method of claim 1 wherein the treatment fluid comprises the oil-coated proppant particulates in an amount from about 0.01 to about 25 pounds per gallon of the treatment fluid.

* * * * *